United States Patent
Fezzey et al.

(10) Patent No.: US 11,591,502 B2
(45) Date of Patent: Feb. 28, 2023

(54) REVERSIBLE NETWORKS IN POLYMERIC MATERIALS

(71) Applicant: Zephyros, Inc., Romeo, MI (US)

(72) Inventors: Sarah Fezzey, Romeo, MI (US); David Kosal, Romeo, MI (US)

(73) Assignee: Zephyros, Inc., Romeo, MI (US)

( * ) Notice: Subject to any disclaimer, the term of this patent is extended or adjusted under 35 U.S.C. 154(b) by 791 days.

(21) Appl. No.: 16/334,498

(22) PCT Filed: Sep. 19, 2017

(86) PCT No.: PCT/US2017/052123
§ 371 (c)(1),
(2) Date: Mar. 19, 2019

(87) PCT Pub. No.: WO2018/053455
PCT Pub. Date: Mar. 22, 2018

(65) Prior Publication Data
US 2021/0277295 A1  Sep. 9, 2021

Related U.S. Application Data

(60) Provisional application No. 62/539,082, filed on Jul. 31, 2017, provisional application No. 62/396,297, filed on Sep. 19, 2016.

(51) Int. Cl.
*C09J 163/00* (2006.01)
*C08K 5/17* (2006.01)
*C08L 33/08* (2006.01)

(52) U.S. Cl.
CPC .............. *C09J 163/00* (2013.01); *C08K 5/17* (2013.01); *C08L 33/08* (2013.01); *C09J 2301/408* (2020.08); *C09J 2301/502* (2020.08); *C09J 2400/163* (2013.01)

(58) Field of Classification Search
CPC ...................................... C09J 163/00
See application file for complete search history.

(56) References Cited

U.S. PATENT DOCUMENTS 8,236,128 B2  8/2012  Kassa et al.
9,260,640 B1  2/2016  Mac Murray

OTHER PUBLICATIONS

PCT Search Report & Written Opinion dated Dec. 14, 2017, Application No. PCT/US2017/052123.
Chinese First Office Action dated Dec. 11, 2020, Application No. 201780057616.4.
European Communication dated Jun. 25, 2020, Application No. 17787062.3.

*Primary Examiner* — Wenwen Cai
(74) *Attorney, Agent, or Firm* — The Dobrusin Law Firm, PC

(57) ABSTRACT

A polymeric material comprising from about 5% to about 60% of a Diels-Alder additive, wherein the additive cross-links at a temperature below 100° C., an adhesive or sealant component, wherein the viscosity of the adhesive or sealant is reduced by at least about 5%, at least about 30%, at least about 80%, or even at least about 100% when combined with the Diels-Alder additive.

19 Claims, 1 Drawing Sheet

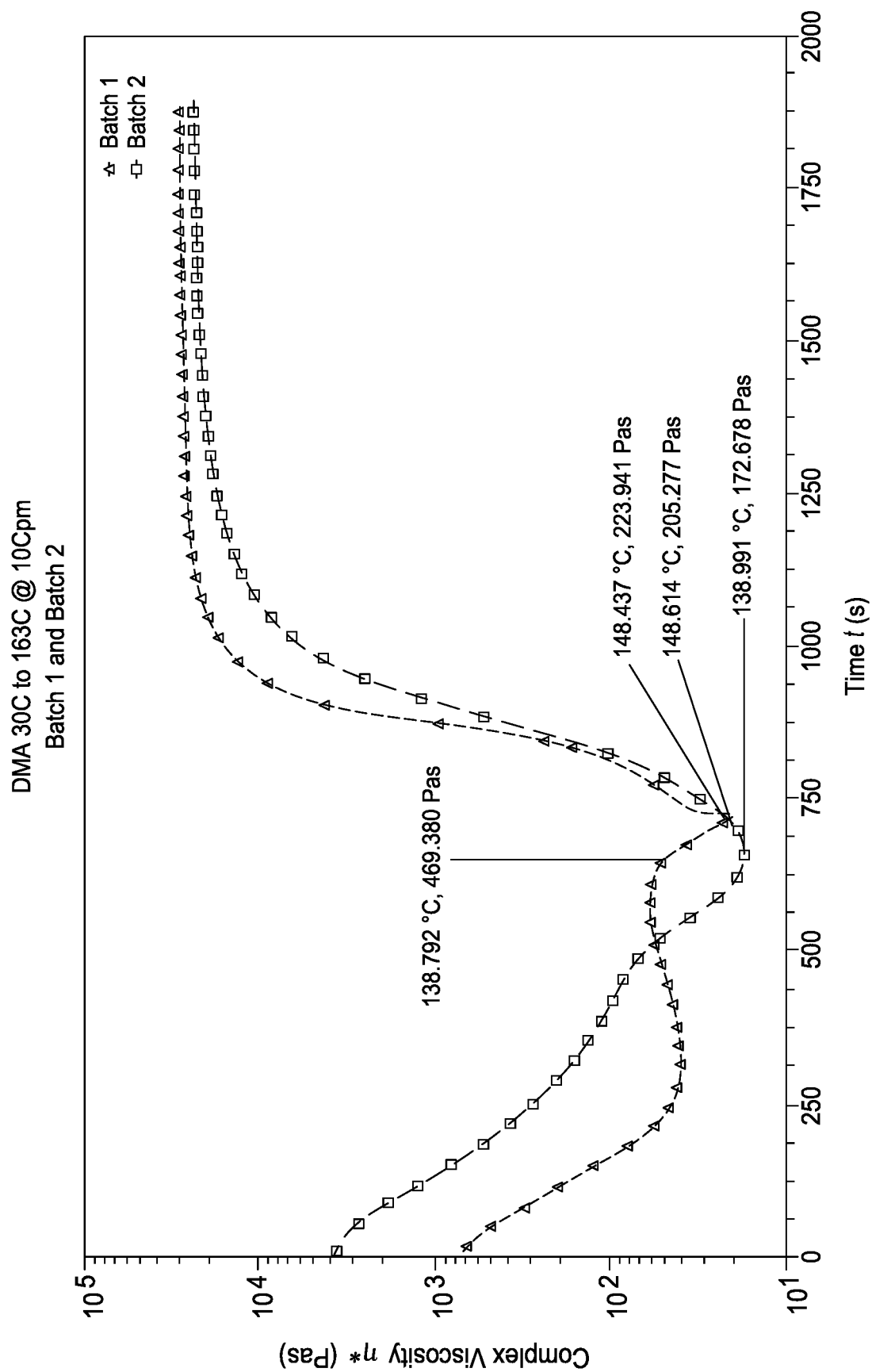

REVERSIBLE NETWORKS IN POLYMERIC MATERIALS

TECHNICAL FIELD

The present teachings relate generally to additives prepared utilizing Diels-Alder reactions. More specifically, the present teachings relate to additives useful for bonding dissimilar substrates.

BACKGROUND

Current trends in the automotive industry and elsewhere involve reducing weight in structures for a variety of reasons. One methodology is to use lower density substrates. Aluminum, composites and magnesium are currently being utilized to supplement and thus reduce the amount of steel used in vehicles and other structures. Since many structures are made of steel however, it will be necessary to bond steel to these lighter substrates including but not limited to aluminum and composite materials (e.g., epoxy composite materials). There are at least two major difficulties when bonding these dissimilar substrates together: (1) the possibility of galvanic corrosion due to electrode potential between two different substrates; and (2) the difficulties that arise from difference in coefficient of thermal linear expansion between two different substrates. Galvanic corrosion can be minimized by placing a relatively non-conductive adhesive between the two different substrates (such as aluminum and steel). However, the coefficient of thermal linear expansion (CTLE) difference can cause de-bonding of the adhesive and/or deformation in the lighter substrate. As an example, aluminum has a CTLE of around $22 \times 10^{-6}$ m/(mK) while steel has a CTLE of around $11 \times 10^{-6}$ m/(mK). This means that the aluminum expands about twice as much over the same change in temperature as compared to steel.

When using a heat activated structural adhesive to bond aluminum to steel, the adhesive is generally applied to a first substrate. The other substrate is then brought into contact with the first substrate with adhesive applied. Typically, a few mechanical fasteners or welds are used to hold the structure together and provide needed pressure for good adhesive bonding. As the resulting structure is conveyed through curing ovens, the adhesive first softens and the aluminum and steel begin to expand. As the structure progresses through the oven, the adhesive begins to cure and the metals continue to expand. It is possible that the difference in expansion between the two metals is large enough that the soft uncured adhesive is pulled away from the matching substrate before the adhesive cures. This may result in the adhesive not being in intimate contact with the mating substrate as desired. Now that the substrates have separated and there is a gap between the adhesive layer so that once the adhesive cures there will be insufficient adhesion when the structure cools and the metallic substrates shrink back down to their pre-expanded dimensions.

A second possible defect mechanism may be that the difference in expansion between the aluminum and steel are such that a significant amount of stress can be "locked" into place once the adhesive cures. When the two metallic layers cool and attempt to return to their original dimensions, the adhesive prohibits this action causing a kink in one or both of the metallic substrates.

Similar issues arise when the adhesive is located adjacent a metallic class A vehicle surface. Such adhesives are typically used for panel stiffening patches. As the metallic panel expands and shrinks, the adhesive cures causing stress on the panel and "read-through" occurs causing unsightly marks on the panel surface.

Notwithstanding the foregoing, it would be desirable to create a process or additive for an adhesive that could provide an ability for the adhesive to be reversible such that crosslinks may be formed and unformed as the metallic materials expand and contract.

SUMMARY OF THE INVENTION

One or more of the above needs are met by the present teachings which contemplate a polymeric material comprising from about 5% to about 60% of a Diels-Alder additive, wherein the additive crosslinks at a temperature below 100° C., and a curable adhesive or sealant component, wherein the viscosity of the adhesive or sealant is reduced by at least about 5% when combined with the Diels-Alder additive.

The adhesive or sealant component may include an epoxy. Any crosslinks in the additive may be reversible upon the application of heat. The additive may be a furfurylamine-based material. The addition of the additive may reduce shrinking of the adhesive or sealant during cure as compared to the adhesive or sealant without the additive. A fracture in the polymeric material may be mended at any time after cure of the polymeric material by heating the polymeric material to reverse any crosslinks in the additive. The polymeric material may adhere to a substrate upon cure, but can be de-bonded from the substrate upon the addition of heat. The polymeric material may be injection moldable. Recycling of the material may be enabled by reversing the crosslinks in the additive. The reduction of the viscosity of the adhesive or sealant component may reduce shear during injection molding which in turn minimizes unwanted premature curing of the adhesive or sealant and enables longer shelf life of the material. The adhesive or sealant component may be a thermoset material. The adhesive or sealant component may be a thermoplastic material.

The volume expansion of the material may be increased by at least about 30% or even at least about 40% as compared to a material without the additive. The additive may be present in a ratio of 5:1 to 1:5 additive to toughening agent. The minimum viscosity of the material may be reduced by at least about 10% or even at least about 20% as compared to a material without the additive. The additive may be present in a ratio of 5:1 to 1:5 additive to ethylene methyl acrylate copolymer. The peak flexural load may be increased by at least 2% or even at least 3% as compared to a material without the additive.

The teachings herein further provide for a method for the use of the materials described herein including applying the material to a first substrate, applying a second substrate to the material so that the material joins the first and second substrate, heating the material and substrates and cooling the material and substrates. The first substrate and second substrate may be dissimilar in composition and wherein the material is substantially free of any cohesive failure.

The teachings herein are also directed to a method for the use of the material described herein including applying the material to a thin gauge metallic substrate, heating the materials and the substrate, and cooling the material and the substrate. Upon cooling, the substrate is substantially free of any read-through.

The method may include one or more additional heating and cooling steps. One or more of the substrates may be part of a transportation vehicle.

The teachings herein further envision use of the material described herein to join two dissimilar materials. The teachings herein also provide for use of the material described herein as part of a panel stiffening patch

BRIEF DESCRIPTION OF THE DRAWINGS

FIG. 1 is a graphic representation showing the complex viscosity of exemplary materials described herein over time as temperature increases from 30° C. to 163° C.

DETAILED DESCRIPTION

The present teachings meet one or more of the above needs by the improved devices and methods described herein. The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

This application claims the benefit of the filing date of U.S. Provisional Application Ser. No. 62/396,297, filed Sep. 19, 2016, and U.S. Provisional Application Ser. No. 62/539,082, filed Jul. 31, 2017, the contents of these application being hereby incorporated by reference herein for all purposes.

A reversible network polymer is contemplated by the teachings herein. Desirably, upon exposure to a temperature of from about 140° C. to 180° C., the network bonds may be broken and reversion back to low viscosity starting materials (e.g., monomers) is possible. This reversible network can be added to a thermosetting adhesive to relieve some of the challenges described above. For instance, when an adhesive is used to join aluminum to steel, the adhesive may, during the curing process, become de-bonded due to the different expansion rates between the two metals. The adhesive first has a reduction in viscosity when exposed to the high curing temperature. Before the crosslinking reaction takes place, the difference in expansion between the aluminum and steel can cause a sizable gap to form between the two metals. Typically, the adhesive remains bonded to each substrate, but fails cohesively within the adhesive. While the structure continues to be exposed to the high curing temperature, the adhesive cures and becomes non-tacky and rigid. Once the structure cools, the metals return to their original dimension. However, since the adhesive crosslinked during the curing process, the two layers of adhesive (as a result of the cohesive failure) do not form any bond when they come into contact with one another. It is contemplated that the addition of a specific amount of a reversible network to the adhesive will resolve the abovementioned problem. The adhesive may still de-bond for the same reasons as described above, but when the two adhesive layers come back together, there will be sufficient adhesion to cause the layers to form a bond.

The bonds of the reversible network then reform during the cooling process. It is also possible that the lowering of viscosity from the reversible polymer may help to relieve stress upon substrate cooling.

The teachings herein are predicated generally upon the use of an additive in activatable adhesive and/or sealant materials, whereby the additive imparts a reversible polymer crosslink network that can be reversed upon the application of heat. The addition of the additives described herein to other polymeric materials (which may be polymeric thermoplastic/thermoset materials) is also envisioned.

One or more of the above needs are met by the present teachings which contemplate a polymeric material comprising from about 5% to about 20% of a Diels-Alder additive, wherein the additive crosslinks at a temperature below 100° C., a curable adhesive or sealant component, wherein the viscosity of the adhesive or sealant is reduced by at least about 5%, at least about 30%, at least about 80%, or even at least about 100% when combined with the Diels-Alder additive.

The adhesive or sealant component may include an epoxy. The adhesive or sealant component may be an activatable material that expands and/or cures upon contact with a stimulus, which may be heat, moisture, UV light, induction, or any stimulus capable of causing activation. The adhesive or sealant component may include one or more of a flexibilizer, a toughening agent, a curing agent, a blowing agent, a filler (which may be a conductive filler), or any combination of these. Examples of suitable adhesives and sealants are described in U.S. Pat. Nos. 8,236,128; 8,105,460; 6,905,745; 6,777,049; 7,892,396; 7,199,165; 7,125,461; and 6,846,559; all of which are incorporated by reference herein for all purposes.

The adhesive materials and sealant materials may include an epoxy resin component. Epoxy resin is used herein to mean any of the conventional epoxy materials containing at least one epoxy functional group. The epoxy resins can be difunctional, trifunctional, multifunctional, combinations thereof or otherwise. Moreover, the term epoxy resin can be used to denote one epoxy resin or a combination of epoxy resins. The polymer-based materials may be epoxy-containing materials having one or more oxirane rings polymerizable by a ring opening reaction. In preferred embodiments, the adhesive and/or sealant material of this invention includes between about 2% and 70% by weight epoxy resin, more preferably between about 7% and 50% by weight epoxy resin and even more preferably between about 15% and 40% by weight epoxy resin and even possibly between about 15% and about 25% by weight epoxy resin.

The epoxy may be aliphatic, cycloaliphatic, or aromatic. The epoxy may be supplied as a solid (e.g., as pellets, chunks, pieces or the like) or a liquid (e.g., an epoxy resin) or both. As used herein, a resin is considered to be a solid resin if it is solid at a temperature of 23° C. and is considered to be a liquid resin if it a liquid at 23° C. The presence of the epoxy resin increases the adhesion, flow properties, or both of the adhesive and/or sealant. One exemplary epoxy resin may be a phenolic resin, which may be a novalac type or other type resin. For example, bisphenol A resin, bisphenol F resin, a combination thereof or the like may be employed. Moreover, various mixtures of several different epoxy resins may be employed. Examples of suitable epoxy resins are sold under the tradename DER® (e.g., DER 331, DER 661, DER 662), commercially available from the Dow Chemical Company, Midland, Mich.

Liquid epoxy resins may be utilized. Such resins may be utilized to reduce the overall viscosity of the adhesive or sealant. Liquid epoxy resins that may be used typically have a viscosity at a temperature of 23° C. of at least 5000, more typically at least 8000 and even possibly at least 11,000 cps, but typically less than 30,000, more typically less than 22,000 and even possibly less than 15,000 cps, although higher and lower values may also be possible unless otherwise stated. The liquid epoxy resin typically has an epoxy equivalent weight of at least 80, more typically at least 150 and even possibly at least 185 g/eq, but typically less than 300, more typically less than 220 and even possibly less than 195 g/eq, although higher and lower values may also be possible unless otherwise stated. Preferred liquid resins include diglycidyl ethers that may be aromatic phenol based (bisphenol A or F) and are sold under the tradename DER 331, commercially available from the Dow Chemical Company and EPON 828 and EPON 863, commercially available from Hexion Specialty Chemicals.

In the preferred embodiment the epoxy resins used are such that the formulated adhesive and sealant are dry to the touch at ambient temperature.

Additional polymeric materials may be utilized. As one example, one or more thermoplastic modifiers such as polyethers which include pendant hydroxyl moieties. Particularly desirable thermoplastic polyethers are phenoxy resins. As used herein, phenoxy resin is a polyhydroxyether, with ether linkages along the polymer backbone and pendant hydroxyl groups. One useful phenoxy resin is the reaction product of a phenol based difunctional epoxy resin and a difunctional phenol (for example the reaction product of bisphenol A epoxy with bisphenol A). A similar material may also be synthesized directly from a bisphenol (for example bisphenol A) and epichlorohydrin. The terminal epoxy group may be ring opened to generate a terminal alpha glycol group. The phenoxy resins have weight-average molecular weights of at least about 5,000, more typically at least about 25,000 and still more typically at least about 50,000 but less than about 100,000, more typically less than about 75,000 and still more typically less than about 60,000. Other thermoplastic polyethers include aromatic ether/amine repeating units in their backbones such as polyetheramines, poly(amino ethers), copolymers of monoethanolamine and diglycidyl ether, combinations thereof or the like. Examples of thermoplastic polyethers are disclosed in U.S. Pat. Nos. 5,275,853; 5,464,924 and 5,962,093. The thermoplastic modifiers such as the polyethers preferably comprise between 3% and about 40% by weight of the adhesive or sealant material and even more preferably between about 10% and 30% more preferably between 10% and about 15%.

Several additional polymers may be incorporated into the adhesive and/or sealant material, e.g., by copolymerization, by blending, or otherwise. For example, without limitation, other polymers that might be appropriately incorporated into the sealant material include halogenated polymers, polycarbonates, polyketones, urethanes, polyesters, silanes, sulfones, allyls, olefins, styrenes, acetates, ethylene vinyl acetates, acrylates, methacrylates, epoxies, silicones, phenolics, rubbers, polyphenylene oxides, terphthalates, or mixtures thereof. Other potential polymeric materials may be or may include, without limitation, polyethylene, polypropylene, polystyrene, polyolefin, polyacrylate, poly(ethylene oxide), poly(ethyleneimine), polyester, polyurethane, polysiloxane, polyether, polyphosphazine, polyimide, polyimide, polyisobutylene, polyacrylonitrile, poly(vinyl chloride), poly(methylmethacrylate), poly(vinyl acetate), poly(vinylidene chloride), polytetrafluoroethylene, polyisoprene, polyacrylamide, polyacrylic acid, polymethacrylate, and polyacetals.

It is possible that the adhesive and/or sealant material includes an acrylate copolymer, acetate copolymer or both. The adhesive and/or sealant material may include ethylene methyl acrylate (EMA), ethylene vinyl acetate (EVA) or a combination thereof. When included, EMA is typically between about 1% and about 70%, more typically between about 30% and about 60% and even more typically between about 44% and about 55% by weight of the adhesive and/or sealant material. A desirable EMA can have a melt index between about 110 and about 150 grams/10 min. (e.g., about 135 grams/10 min.). One preferred EMA is sold under the tradename TC140 and is commercially available from Exxon. When included, EVA is typically between about 1% and about 70%, more typically between about 2% and about 10% and even more typically between about 3% and about 5% by weight of the material.

The adhesive and/or sealant material may include one or more additional polymers (e.g., copolymers), which are typically, but not necessarily copolymers or terpolymers, which can include a variety of different polymers, such as thermoplastics, elastomers, thermosets, thermosettables combinations thereof or the like. For example, and without limitation, polymers that might be appropriately incorporated into the adhesive and/or sealant material include halogenated polymers, polycarbonates, polyketones, and polymers of urethanes, polyesters, silanes, sulfones, allyls, olefins, styrenes, acrylates, methacrylates, epoxies, silicones, phenolics, rubbers, polyphenylene oxides, terphthalates, acetates (e.g., EVA), acrylates, methacrylates (e.g., ethylene methyl acrylate polymer) or mixtures thereof. Other potential polymeric materials may be or may include, without limitation, polyolefin (e.g., polyethylene, polypropylene) polystyrene, polyacrylate, polyethylene oxide), poly (ethyleneimine), polyester, polyurethane, polysiloxane, polyether, polyphosphazine, polyimide, polyimide, polyisobutylene, polyacrylonitrile, polyvinyl chloride), poly(methyl methacrylate), polyvinyl acetate), poly(vinylidene chloride), polytetrafluoroethylene, polyisoprene, polyacrylamide, polyacrylic acid, polymethacrylate. Although not required, it may be desired for the adhesive and/or sealant material to include one or more ethylene polymers or copolymers such as ethylene acrylates, ethylene acetates, or the like. Ethylene methacrylate and ethylene vinyl acetate are two preferred ethylene copolymers. When used, the one or more additional polymers comprises about 0.1% to about 50%, more preferably about 1% to about 20% and even more preferably about 5% to about 15% by weight of the adhesive and/or sealant material.

The adhesive and/or sealant material can also include one or more materials for controlling the rheological characteristics of the sealant material over a range of temperatures (e.g., up to about 250° C. or greater). Any suitable art-disclosed rheology modifier may be used, and thus the rheology modifier may be organic or inorganic, liquid or solid, or otherwise. The rheology modifier may be a polymer, and more preferably one based upon an olefinic (e.g., an ethylene, a butylenes, a propylene or the like), a styrenic (e.g., a styrene-butadiene-containing rubber), an acrylic or an unsaturated carboxylic acid or its ester (such as acrylates, methacrylates or mixtures thereof; e.g., ethylene methyl acrylate (EMA) polymer) or acetates (e.g., EVA). The rheology modifier may be provided in a generally homogeneous state or suitable compounded with other ingredients. It is also contemplated that the various clays, minerals or other materials discussed in relation to fillers below can be employed to modify rheology of the adhesive and/or sealant material.

The adhesive and/or sealant material may each include one or more curing agents that assist the adhesive and/or sealant material in curing by crosslinking of the polymers, epoxy resins and other ingredients in the material. The amount of curing agents or curing agent accelerators present in the adhesive and/or sealant material range from about 0.001% by weight to about 9% by weight and more typically from about 0.2 to about 6 wt %, and even more typically from about 2 wt % to about 6% by weight. The curing agent materials can be selected from aliphatic or aromatic amines or their respective adducts, amidoamines, polyamides, cycloaliphatic amines, anhydrides, polycarboxylic polyesters, isocyanates, phenol-based resins (e.g., phenol or cresol novolac resins, copolymers such as those of phenol terpene, polyvinyl phenol, or bisphenol-A formaldehyde copolymers, bishydroxyphenyl alkanes or the like), dihydrazides, sulfonamides, diamino diphenyl sulfone, anhydrides, mercaptans, imidazoles, ureas, tertiary amines, BF3 complexes or mixtures thereof. Particular preferred curing agents include modified and unmodified polyamines or polyamides such as triethylenetetramine, diethylenetriamine tetraethylenepentamine, cyanoguanidine, dicyandiamides and the like.

An accelerator for the curing agents (e.g., a modified or unmodified urea such as methylene diphenyl bis urea, an imidazole, blocked amine or a combination thereof) may also be provided for preparing the adhesive and/or sealant material.

The adhesive and/or sealant materials may contain other additives such as flexibilizers, impact modifiers, polymers or copolymers fillers and other elongation promoting additives.

If included, such impact modifiers (e.g., toughening agents) contribute to the desired mechanical properties of the adhesive and/or sealant material such as Lap Shear and T Peel strength by the distribution of energy within the adhesive and/or sealant system. It is generally preferable for the impact modifier to be at least 4%, more typically at least 10%, and even more typically at least 20% by weight of the adhesive and/or sealant material and also preferable for the impact modifier to be less than 70%, more typically less than 40% an even more typically less than 30% by weight of the adhesive and/or sealant material. The term "impact modifier" can include one impact modifier or several impact modifiers. The impact modifier can include thermoplastics, thermosets or thermosettables, elastomers, combinations thereof or the like. In a preferred embodiment the impact modifier includes elastomer (including elastomer containing materials), a core/shell polymer (which may include elastomer), or a combination thereof.

The impact modifier may include a substantial portion of core/shell impact modifier. When it includes a core/shell polymer it is preferred that the impact modifier is comprised of at least 60%, more typically at least 80% and even possibly at least 97% core/shell polymer. As used herein, the term core/shell impact modifier denotes an impact modifier wherein a substantial portion (e.g., greater than 30%, 50%, 70% or more by weight) thereof is comprised of a first polymeric material (i.e., the first or core material) that is substantially entirely encapsulated by a second polymeric material (i.e., the second or shell material). The first and second polymeric materials, as used herein, can be comprised of one, two, three or more polymers that are combined and/or reacted together (e.g., sequentially polymerized) or may be part of separate or the same core/shell systems.

The first and second polymeric materials of the core/shell impact modifier can include elastomers, polymers, thermoplastics, copolymers, other components, combinations thereof or the like. In preferred embodiments, the first polymeric material, the second polymeric material or both of the core/shell impact modifier include or are substantially entirely composed of (e.g., at least 70%, 80%, 90% or more by weight) one or more thermoplastics. Exemplary thermoplastics include, without limitation, poly-styrenics, poly-acrylonitriles, poly-acrylates, poly-acetates, polyamides, and poly-olefins.

Preferred core/shell impact modifiers are formed by emulsion polymerization followed by coagulation or spray drying. In certain applications, coagulated grades of core/shell impact modifiers have been found particularly desirable for promoting adhesion to surfaces having impurities thereon such as dirt, oil (e.g., metal stamping oil) or the like. Such impact modifiers can reduce the likelihood of adhesive failure (as opposed to cohesive failure).

Examples of useful core-shell graft copolymers that may be used as impact-modifiers are those where hard containing compounds, such as styrene, acrylonitrile or methyl methacrylate, are grafted onto a core made from polymers of soft or elastomeric containing compounds such as butadiene or butyl acrylate. U.S. Pat. No. 3,985,703, describes useful core-shell polymers, the core polymers of which are made from butyl acrylate but can be based on ethyl isobutyl, 2-ethylhexyl or other alkyl acrylates or mixtures thereof. The core polymer may also include other copolymerizable containing compounds, such as styrene, vinyl acetate, methyl methacrylate, butadiene, isoprene, or the like. The core polymer material may also include a cross linking monomer having two or more nonconjugated double bonds of approximately equal reactivity such as ethylene glycol diacrylate, butylene glycol dimethacrylate, and the like. The core polymer material may also include a graft linking monomer having two or more nonconjugated double bonds of unequal reactivity such as, for example, diallyl maleate and allyl methacrylate.

The shell portion may be polymerized from methyl methacrylate and optionally other alkyl methacrylates, such as ethyl and butyl methacrylates or mixtures thereof. Up to 40 percent by weight or more of the shell monomers may be styrene, vinyl acetate, vinyl chloride, and the like. Additional core-shell graft copolymers useful in embodiments of the present invention are described in U.S. Pat. Nos. 3,984, 497; 4,096,202; 4,034,013; 3,944,631; 4,306,040; 4,495, 324; 4,304,709; and 4,536,436. Examples of core-shell graft copolymers include, but are not limited to, "MBS" (methacrylate-butadiene-styrene) polymers, which are made by polymerizing methyl methacrylate in the presence of polybutadiene or a polybutadiene copolymer rubber. The MBS graft copolymer resin generally has a styrene butadiene rubber core and a shell of acrylic polymer or copolymer. Examples of other useful core-shell graft copolymer resins include, ABS (acrylonitrile-butadiene-styrene), MABS (methacrylate-acrylonitrile-butadiene-styrene), ASA (acrylate-styrene-acrylonitrile), all acrylics, SA EPDM (styrene-acrylonitrile grafted onto elastomeric backbones of ethylene-propylene diene monomer), MAS (methacrylic-acrylic rubber styrene), and the like and mixtures thereof.

The adhesive and/or sealant composition may be activatable (e.g., foamable) and as such it may contain one or more foaming agents that typically produce inert gasses that transform the adhesive/sealant into an open and/or closed cellular structure. The expansion can help to improve adhesion, sealing capability, acoustic damping, reduce density, or a combination of factors. Amounts of blowing agents and blowing agent accelerators that can be used can vary widely depending upon the type of cellular structure desired, the desired amount of expansion of the adhesive and/or sealant material, the melt viscosity of the materials, and the desired rate of expansion. Exemplary ranges for the amounts of blowing agents and blowing agent accelerators in the activatable material range from about 0.001% by weight to 2%.

Chemical blowing agents that may be used include one or more nitrogen containing groups such as amides, amines, and the like. Examples of suitable blowing agents include dinitrosopentamethylenetetramine, azodicarbonamide, dinitrosopentamethylenetetramine, 4,4'oxy-bis-(benzene-sulphonylhydrazide), trihydrazinotriazine and N,N'-dimethyl-N,N'-dinitroso-terephthalamide.

Physical blowing agents may additionally or alternatively be employed. As one example, solvent filled polymeric shells that soften and expand upon exposure to heat may be used. A typical example is sold under the trade name Expancel by Akzo Nobel.

An accelerator for the chemical blowing agents may also be provided in the adhesive and/or sealant material to increase the rate at which the blowing agents form inert gasses. One preferred blowing agent accelerator is a metal salt, such as an oxide, for example zinc oxide. Other preferred accelerators include organic bases such as urea and organic acids such as adipic or benzoic acid. Zinc benzene sulfonate may also be a desirable accelerator.

The adhesive and/or sealant material of the present invention may also include one or more fillers, including but not limited to particulate materials (e.g., powder), beads, microspheres, or the like. Use of fillers can impart properties such as strength, dimensional stability, and impact resistance to the adhesive and/or sealant they can however reduce elongation properties. Filler addition can also reduce formulation cost and produce products that have less tack prior to cure.

Examples of fillers that may be used include silica, diatomaceous earth, glass, clay (e.g., including nanoclay), talc, pigments, colorants, glass beads or bubbles, carbon or ceramic fibers and nylon or polyamide fibers (e.g., Kevlar). Examples of suitable fillers include, without limitation, wollastonite, talc, vermiculite, pyrophyllite, sauconite, saponite, nontronite, montmorillonite or mixtures thereof. Clays usable for the adhesive and/or sealant material may be calcined or uncalcined. Clays that may be used as fillers may include clays from the kaolinite, illite, chloritem, smecitite or sepiolite groups, which may be calcined. The clays may also include minor amounts of other ingredients such as carbonates, feldspars, micas and quartz. One or more mineral or stone type fillers such as calcium carbonate, sodium carbonate or the like may be used as fillers. Silicate minerals such as mica may be used as fillers.

When employed, the amount of fillers in the adhesive and/or sealant material can range from 2% to more than 30% or greater by weight, but more typical from about 8 to 25% by weight, however amounts (below 20%) are preferable in order to retain the desired elongation of the adhesive and/or sealant. According to some embodiments, the adhesive and/or sealant material may include from about 0% to about 3% by weight, and more preferably slightly less than 1% by weight clays or similar fillers. Powdered (e.g. about 0.01 to about 50, and more preferably about 1 to 25 micron mean particle diameter) mineral type filler can comprise between about 5% and 40% by weight, more preferably about 10% to about 25% by weight.

Any crosslinks in the additive may be reversible upon the application of heat. The additive may be a furfurylamine-based material. Other materials that lend themselves to use in a Diels-Alder reaction may also be utilized. Examples of such materials can be found in U.S. Pat. Nos. 4,739,017; 4,731,418; and 5,310,796; all of which are incorporated by reference herein for all purposes.

The additive may provide for a variety of benefits when included in an adhesive or sealant material. Such benefits may be realized as a result of the reduction in viscosity of the adhesive or sealant upon mixing with the additive. The viscosity may be reduced by at least about 5% as compared with the viscosity of the sealant or adhesive (e.g., the viscosity in a green state). The viscosity may be reduced by at least about 1% as compared with the viscosity of the sealant or adhesive. The viscosity may be reduced by at least about 30% as compared with the viscosity of the sealant or adhesive. The viscosity may be reduced by at least about 50% as compared with the viscosity of the sealant or adhesive. The viscosity may be reduced by at least about 80%, at least 100% or even at least 120% as compared with the viscosity of the sealant or adhesive.

The addition of the additive may act to reduce shrinking of the adhesive or sealant during cure as compared to the adhesive or sealant without the additive. Thus "read-through" or other material deficiencies caused by dissimilar coefficients of thermal expansion may be minimized by addition of the additive as described herein.

The additives described herein may be capable of "healing" the adhesive or sealant material simply by way of contact with a stimulus (e.g., heat). A fracture in the polymeric material may be mended at any time after cure of the polymeric material by heating the polymeric material to reverse any crosslinks in the additive. Furthermore, the additive may facilitate the ability of the polymeric material to adhere to a substrate upon cure, but then be de-bonded from the substrate upon the addition of heat.

Another particular challenge for various sealants, adhesives and other polymeric materials that are injection moldable is premature partial cure of the materials dues to the shear imparted to the material during the molding process. Such partial cure reduces the shelf life of the material. The polymeric materials described herein may be injection moldable such that the reduced viscosity has the effect of minimizing shear, which thereby substantially reduces the incidence of premature partial cure.

Recycling of the material may be enabled by reversing the crosslinks in the additive. The adhesive or sealant component may be a thermoset material. The adhesive or sealant component may be a thermoplastic material.

Example

A structural adhesive material was combined with about 10% of the additive as described herein and in the amounts shown in Table 2 below. The resulting material was measured to determine volume expansion, density in the green state, thickness post cure, flexural load at 1 mm, 2 mm, 2.5 mm and 5 mm, and peak flexural load. The results are set forth in Table 1 below.

TABLE 1

| Prototype | Control | 10% Reversible Network |
|---|---|---|
| Volume Expansion (%) | 65 | 94 |
| Uncured Density (g/cc) | 1.23 | 1.21 |
| Cured Thickness (mm) | 2.8 | 3.7 |
| Flexural Load @ 1 mm | 32 | 34 |

TABLE 1-continued

| Prototype | Control | 10% Reversible Network |
|---|---|---|
| Flexural Load @ 2 mm | 53 | 58 |
| Flexural Load @ 2.5 mm | 63 | 69 |
| Flexural Load @ 5 mm | 103 | 121 |
| Peak Flexural Load (N) | 210 | 218 |

Table 1 shows that when 10% by weight of reversible polymer is added to existing epoxy-glass composite stiffening patch, the flexural load is not reduced. Therefore, it should provide the same stiffening ability when utilized in conjunction with thin gauge sheet metal.

Batches 1 (control) and 2 (10% reversible network) are shown below at Table 2. As the DMA curve shows at FIG. 1, there is a 23% reduction in the minimum viscosity when 10% by weight of a reversible network is added to an adhesive system.

TABLE 2

|  | 1 | | 2 | |
|---|---|---|---|---|
|  | % | gram | % | gram |
| EMA copolymer | 4.71 | 3.77 | 4.24 | 3.77 |
| CTBN/Epoxy Copolymer | 13.54 | 10.83 | 12.17 | 10.83 |
| Solid Epoxy/Thixotrope Blend | 8.00 | 6.40 | 7.19 | 6.40 |
| Liquid Epoxy 1 | 20.00 | 16.00 | 17.98 | 16.00 |
| Liquid Epoxy 2 | 16.28 | 13.02 | 14.63 | 13.02 |
| Liquid Epoxy 3 | 2.00 | 1.60 | 1.80 | 1.60 |
| Core-Shell Toughener | 15.22 | 12.18 | 13.69 | 12.18 |
| Latent Amine Curative | 4.38 | 3.50 | 3.93 | 3.50 |
| Curative Accelertor | 0.83 | 0.66 | 0.74 | 0.66 |
| Foaming Agent | 1.65 | 1.32 | 1.48 | 1.32 |
| Filler | 4.87 | 3.90 | 4.38 | 3.90 |
| Filler 2 | 1.00 | 0.80 | 0.90 | 0.80 |
| Fibers | 7.47 | 5.98 | 6.72 | 5.98 |
| Pigment | 0.05 | 0.04 | 0.04 | 0.04 |
| Reversible Polmer |  |  | 10.11 | 9.00 |
|  | 100.00 | 80.00 | 100.00 | 89.00 |

As used herein, unless otherwise stated, the teachings envision that any member of a genus (list) may be excluded from the genus; and/or any member of a Markush grouping may be excluded from the grouping.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the of a range in terms of "at least 'x' parts by weight of the resulting composition" also contemplates a teaching of ranges of same recited amount of "x" in percent by weight of the resulting composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

Use of (meth)acrylic or (meth)acrylate encompasses respectively an acrylic or methacrylic, or an acrylate or methacrylate.

The disclosures of all articles and references, including patent applications and publications, are incorporated by reference for ail purposes. The term "consisting essentially of to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist of, or consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A polymeric material comprising:
    from about 5% to about 60% of an additive preparing by utilizing Diels-Alder reactions, wherein the additive crosslinks at a temperature below 100° C.;
    a curable adhesive or sealant component;
    a physical or chemical blowing agent to facilitate foaming of the polymeric material;
    wherein the viscosity of the curable adhesive or sealant is reduced by at least about 5% when combined with the additive, and wherein the additive is a furfurylamine-based material.

2. The material of claim 1, wherein the curable adhesive or sealant component includes an epoxy.

3. The material of claim 1, wherein any crosslinks in the additive are reversible upon the application of heat.

4. The material of claim 1, wherein the addition of the additive reduces shrinking of the curable adhesive or sealant during cure.

5. The material of claim 2, wherein upon curing of the polymeric material, a fracture in the cured polymeric material can be mended at any time by heating the cured polymeric material to reverse any crosslinks in the additive.

6. The material of claim 1, wherein the polymeric material is adapted to adhere to a substrate upon cure, but is also adapted to be de-bonded from the substrate upon the addition of heat.

7. The material of claim 1, wherein the polymeric material is injection moldable.

8. The material of claim 6, wherein recycling of the polymeric material is enabled by reversing the crosslinks in the additive.

9. The material of claim 1, wherein the reduction of the viscosity of the curable adhesive or sealant component reduces shear during injection molding which in turn minimizes unwanted premature curing of the curable adhesive or sealant and enables longer shelf life of the polymeric material.

10. The material of claim 1, wherein the curable adhesive or sealant component is a thermoset material.

11. The material of claim 1, wherein the volume expansion of the polymeric material is increased by at least about 30% as compared to the polymeric material without the additive.

12. The material of claim 1, wherein the polymeric material includes a toughening agent and the additive is present in a ratio of 5:1 to 1:5 additive to toughening agent.

13. The material of claim 2, wherein the minimum viscosity of the polymeric material is reduced by at least about 10% as compared to the polymeric material without the additive.

14. The material of claim 1, wherein the polymeric material includes an ethylene methyl acrylate copolymer and the additive is present in a ratio of 5:1 to 1:5 additive to ethylene methyl acrylate copolymer.

15. The material of claim 1, wherein the peak flexural load of the polymeric material is increased by at least 2% as compared to the polymeric material without the additive.

16. The material of claim 1, wherein the polymeric material is formed into a panel stiffening patch.

17. The material of claim 15, including a chemical blowing agent selected from dinitrosopentamethylenetetramine, azodicarbonamide, dinitrosopentamethylenetetramine, 4,4'oxy-bis-(benzene-sulphonylhydrazide), trihydrazinotriazine and N,N'-dimethyl-N,N'-dinitroso-terephthalamide, or combinations thereof.

18. The material of claim 15, including a physical blowing agent of solvent filled polymeric shells that soften and expand upon exposure to heat.

19. The material of claim 4, wherein the curable adhesive or sealant cures and/or expands upon exposure to a stimulus.

* * * * *